(12) United States Patent
Bliss (10) Patent No.: US 7,894,151 B2
(45) Date of Patent: *Feb. 22, 2011

(54) "FLAT ANALOG" AFE COUPLED WITH AN ALL DIGITAL ARCHITECTURE COMPENSATION READ CHANNEL

(75) Inventor: William Gene Bliss, Thornton, CO (US)

(73) Assignee: Broadcom Corporation, Irvine, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/032,137

(22) Filed: Feb. 15, 2008

(65) Prior Publication Data

US 2009/0207517 A1 Aug. 20, 2009

(51) Int. Cl.
*G11B 5/09* (2006.01)

(52) U.S. Cl. .......................................... 360/32

(58) Field of Classification Search ........... 360/32, 360/45, 46, 61, 67, 68, 75, 65; 341/110, 341/122; 331/45; 375/233, 355, 341, 324; 324/684, 685
See application file for complete search history.

(56) References Cited

U.S. PATENT DOCUMENTS

| | | | | |
|---|---|---|---|---|
| 4,903,022 A * | 2/1990 | Hester et al. | ................. | 341/110 |
| 5,038,143 A * | 8/1991 | Hester | ......................... | 341/110 |
| 5,079,550 A * | 1/1992 | Sooch et al. | ................ | 341/143 |
| 5,367,409 A * | 11/1994 | Ottesen et al. | ................ | 360/32 |
| 5,768,320 A * | 6/1998 | Kovacs et al. | ............... | 375/341 |
| 5,777,512 A * | 7/1998 | Tripathi et al. | .......... | 330/207 A |
| 5,910,751 A * | 6/1999 | Winn et al. | ................. | 327/560 |
| 5,940,257 A * | 8/1999 | Zavis | ......................... | 361/42 |
| 6,032,109 A * | 2/2000 | Ritmiller, III | ................ | 702/104 |
| 6,369,661 B1 * | 4/2002 | Scott et al. | ..................... | 331/45 |
| 6,518,901 B2 * | 2/2003 | Pinna et al. | ................. | 341/122 |
| 6,519,106 B1 * | 2/2003 | Goh et al. | ...................... | 360/65 |
| 6,590,094 B2 * | 7/2003 | Karlou-Eyrisch et al. | .. | 536/25.4 |
| 6,600,779 B1 * | 7/2003 | Sawada et al. | .............. | 375/233 |
| 6,661,590 B2 * | 12/2003 | Cyrusian et al. | .............. | 360/32 |
| 6,903,890 B2 * | 6/2005 | Aoyagi et al. | .................. | 360/45 |
| 6,977,544 B2 * | 12/2005 | Nicollini et al. | ............. | 327/589 |
| 7,006,938 B2 * | 2/2006 | Laraia et al. | ................ | 702/104 |
| 7,023,946 B2 * | 4/2006 | Sawada et al. | ................ | 375/375 |
| 7,190,178 B2 * | 3/2007 | Laraia et al. | ................ | 324/685 |
| 7,378,858 B2 * | 5/2008 | Laraia et al. | ................ | 324/684 |
| 7,466,782 B1 * | 12/2008 | Patapoutian | ................ | 375/355 |
| 7,486,215 B1 * | 2/2009 | Song et al. | ................... | 341/143 |
| 7,498,882 B2 * | 3/2009 | Dally et al. | .................. | 330/279 |
| 7,627,060 B2 * | 12/2009 | Taylor | ......................... | 375/324 |

(Continued)

*Primary Examiner*—Fred Tzeng
(74) *Attorney, Agent, or Firm*—Garlick Harrison & Markison; Bruce E. Garlick (57) ABSTRACT

Reading data from a magnetic storage media with an analog front end (AFE) coupled to an all digital read channel compensation architecture. A read head passes over magnetic storage media to produce an analog signal. The analog signal is amplified such that the range of the amplified analog signal substantial matches a range of the analog to digital converter (ADC) used to sample the analog signal. A baseline adjust is performed on the amplified analog signal to center the amplified analog signal to a midscale of the ADC. The amplified analog signal may be sampled where the sampling is data frequency locked by a data lock clock (DLC) tracking module. A digital signal may then be produced from the amplified analog signal where this signal is read channel compensated in the digital domain to produce a digital signal which is then processed with a sequence detector.

23 Claims, 6 Drawing Sheets

U.S. PATENT DOCUMENTS

| | | |
|---|---|---|
| 7,668,588 B2 * | 2/2010 | Kovacs ........................ 600/509 |
| 2003/0067975 A1 * | 4/2003 | Yamakura et al. ............ 375/233 |
| 2006/0265167 A1 * | 11/2006 | Laraia et al. ................... 702/99 |
| 2007/0208233 A1 * | 9/2007 | Kovacs ........................ 600/300 |
| 2009/0207517 A1 * | 8/2009 | Bliss ............................ 360/32 |

* cited by examiner

"FLAT ANALOG" AFE COUPLED WITH AN ALL DIGITAL ARCHITECTURE COMPENSATION READ CHANNEL

TECHNICAL FIELD OF THE INVENTION

Embodiments of the present invention relate generally to memory storage devices; and, more particularly, embodiments of the present invention relate signal processing within a magnetic read channel.

BACKGROUND OF THE INVENTION

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. Data stored on the disks may be accessed by moving RW heads radially as driven by a head actuator to the radial location of the track containing the data. To efficiently and quickly access this data, fine control of RW hard positioning is required. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

With increases in data density stored to the hard disk, the effects of noise components within the analog portion of the read channel are increased. Typically, read channel compensation is performed in the analog domain.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Embodiments of the present invention are illustrated in the FIGs., like numerals being used to refer to like and corresponding parts of the various drawings.

Embodiments of the present invention provide a read-channel integrated circuit (IC) for use within a hard disk drive (HDD). Embodiments of the present invention provide a system and method to read data from magnetic storage media with an analog front end (AFE) coupled to an all digital read channel compensation architecture. This involves passing a read head over a magnetic storage media to produce an analog signal. This may be done within a hard disk drive or other like storage media. The analog signal may then be amplified such that the range of the amplified analog signal substantial matches a range of the ADC used to sample the analog signal. Next a baseline adjust is performed on the amplified analog signal to remove DC content or center the amplified analog signal to a midscale of the ADC. The amplified analog signal may be sampled (or oversampled) where the sampling may be data frequency locked by a data lock clock (DLC) tracking module. A digital signal may then be produced from the amplified analog signal where this signal is filtered to match signal characteristics for bit detection and read channel compensated in the digital domain to produce a compensated digital signal which is then provided to a sequence detector which will produce a bit sequence from the compensated digital signal.

In some embodiments, the read channel compensation performed in the digital domain includes compensation for magnetic resistive asymmetry (MRA) and continuous time filter (CTF) processing. Embodiments of the present invention are operable to leverage the advantages of digital signal processing and apply these advantages to signal processing that previously occurred in the analog domain. This can result in reduced costs associated with the read channel circuitry, by eliminating the need for analog circuits that cannot be efficiently reduced in size as die size decreases.

Dramatic improvements have been made in signal-to-noise ratio (SNR), enabling accurate, reliable recovery of user data from noisy analog signals. Hard drive designers have taken advantage of SNR improvements to make data tracks on a storage disk smaller and pack those tracks tighter. This enables real densities of up to 80-gigabytes-per-platter in desktop-level drives (3.5-inch platters), 40-gigabytes-per-platter in mobile drives (2.5-inch platters) and increased capacity in small-form-factor consumer device drives (1-inch and smaller).

Figure 1:
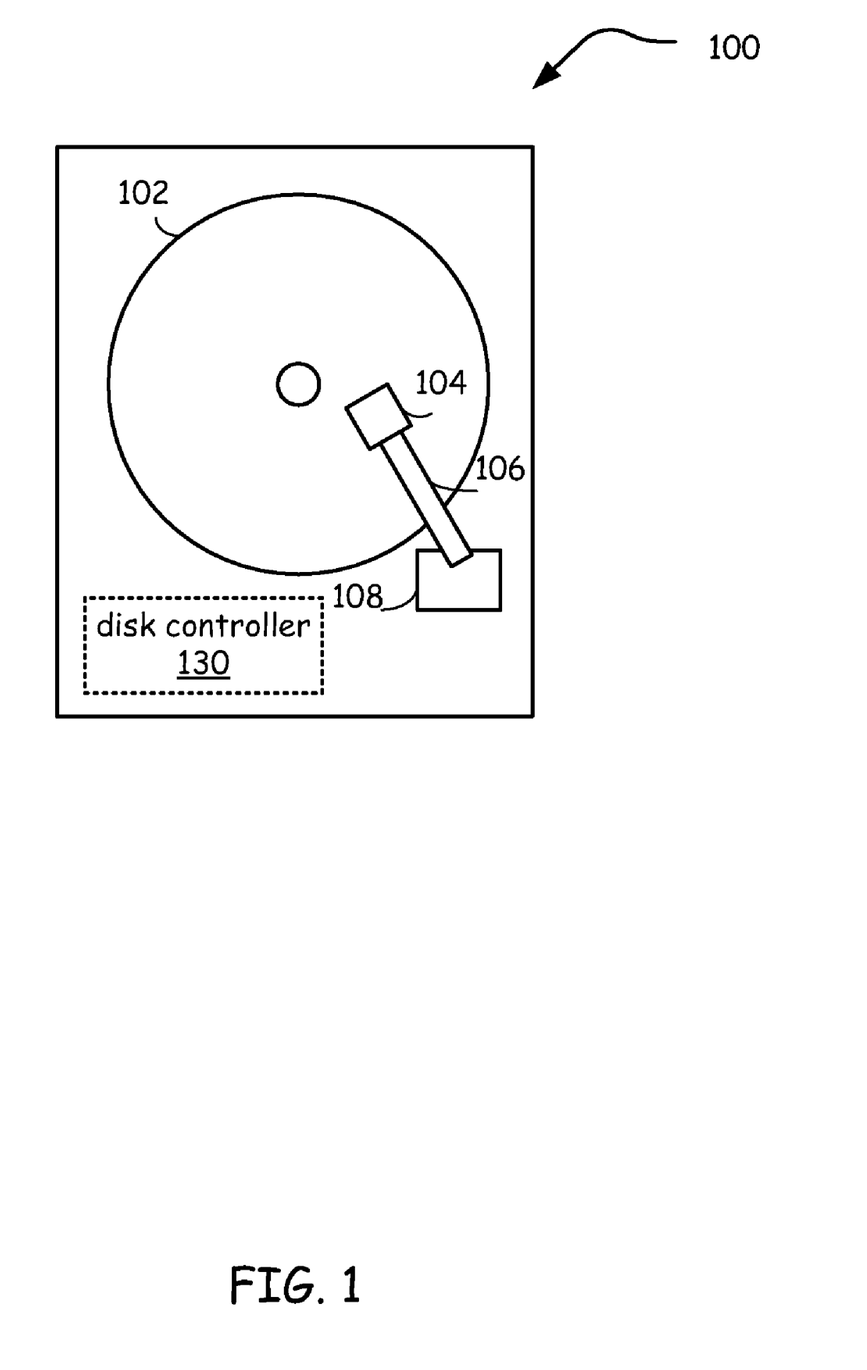
FIG. 1 depicts an embodiment of a disk drive unit in accordance with an embodiment of the present invention.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write (RW) heads 104 that are coupled to arm 106 that is moved by actuator 108 over the surface of the disk 102 either by translation, rotation, or both. The head assembly may also be referred to as a head gimbal assembly (HGA) that positions a RW head, which in some embodiments may be a thin-film magnetic head, to record and read magnetic information into and from a recording surface of a hard disk or recording medium rotating at high speed. Pre-amplifier (within the RW head or located between the RW head and the disk controller) may be used to condition the signals to and from the RW head. Disk controller 130 is included for controlling the read and write operations to and from the drive, for controlling the speed of the servo motor and the motion of actuator 108, and for providing an interface to and from the host device.

Figure 2:
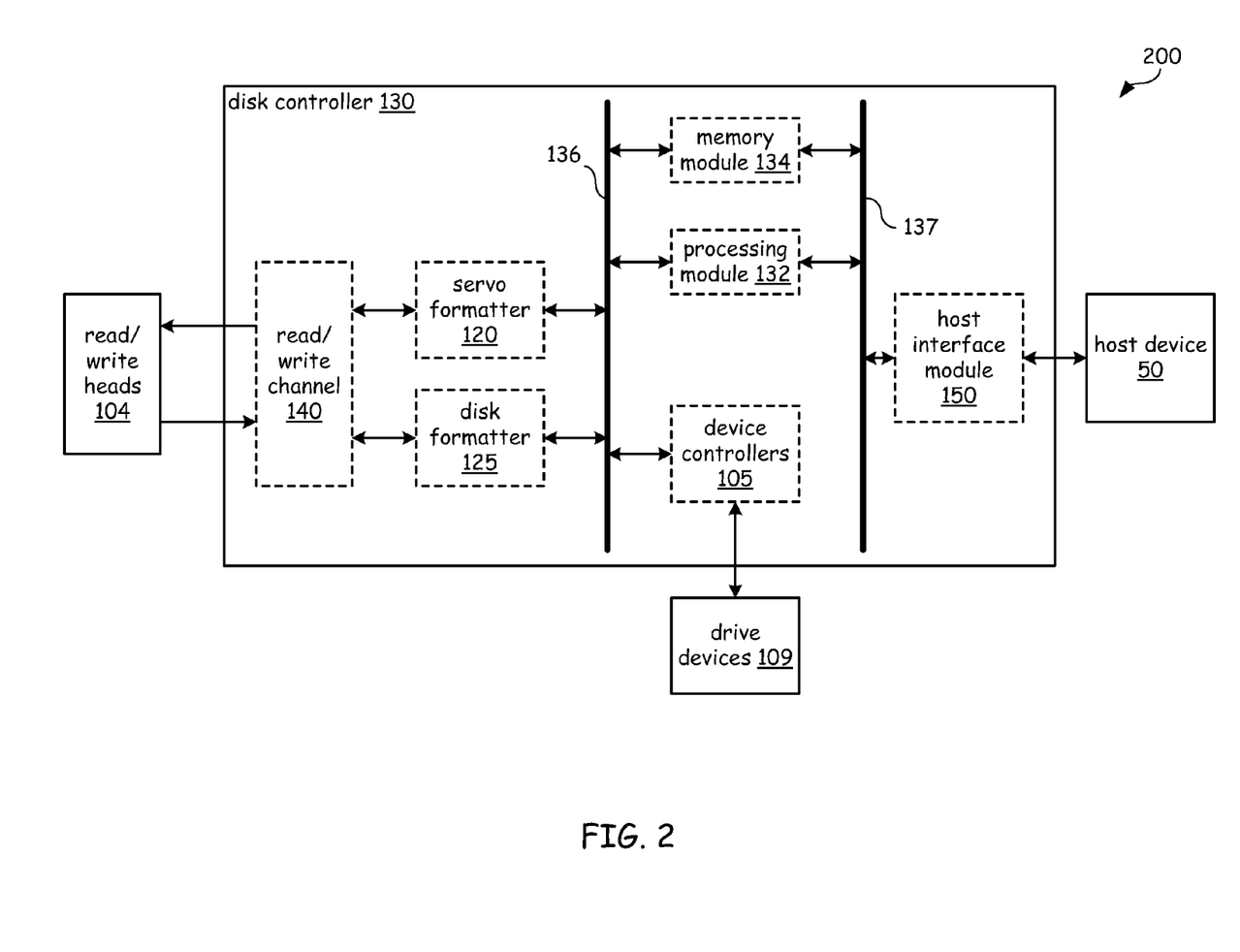
FIG. 2 illustrates an embodiment of a disk controller in accordance with an embodiment of the present invention.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes, or functions in order to provide fault tolerance or redundancy. Alternatively, the function, steps, and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. The host interface 150 can be connected to only the bus 137 and communicates with the host device 50. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3A:
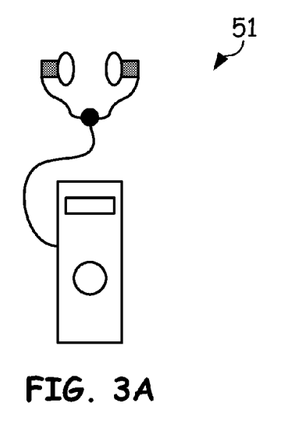
FIGS. 3A through 3E depicts embodiments of various devoices that employ disk drive units in accordance with an embodiment of the present invention.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 3B:
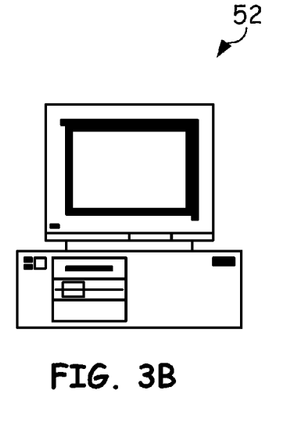

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 3C:
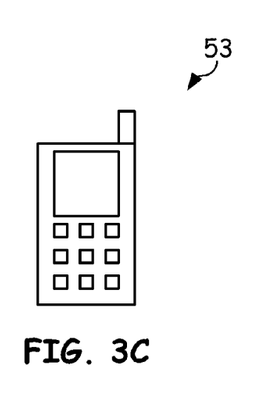

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG point photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 3D:
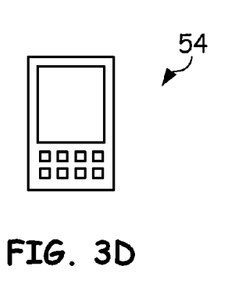

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 3E:
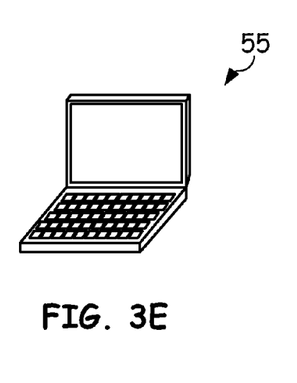

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Data recorded on magnetic disk platters in a drive follow a complex analog path from being initially "read" to final digitization in a read-channel. The feature-rich analog front end (AFE) of a read channel integrates multiple technologies in a single design used for horizontal (also known as longitudinal) recording techniques and higher capacity perpendicular recording. However, perpendicular recording may exhibit increased asymmetry when compare to horizontal recording which is symmetric with even symmetry. This may increase the processing demands placed on the AFE.

A sector is written with a preamble, sync mark, and data. The preamble is constant frequency and the sync mark is a fixed pattern. User data is scrambled with a pseudo-random sequence, encoded, protected with optional added low density parity in block code and pre compensated before being written on the disk as NRZ data, known as non return to zero (NRZ). Servo patterns which are used to position the head on the data track have a similar structure of preamble, SAM (servo address mark), and Gray code with additional, bursts and a repeatable run out field.

Figure 4:
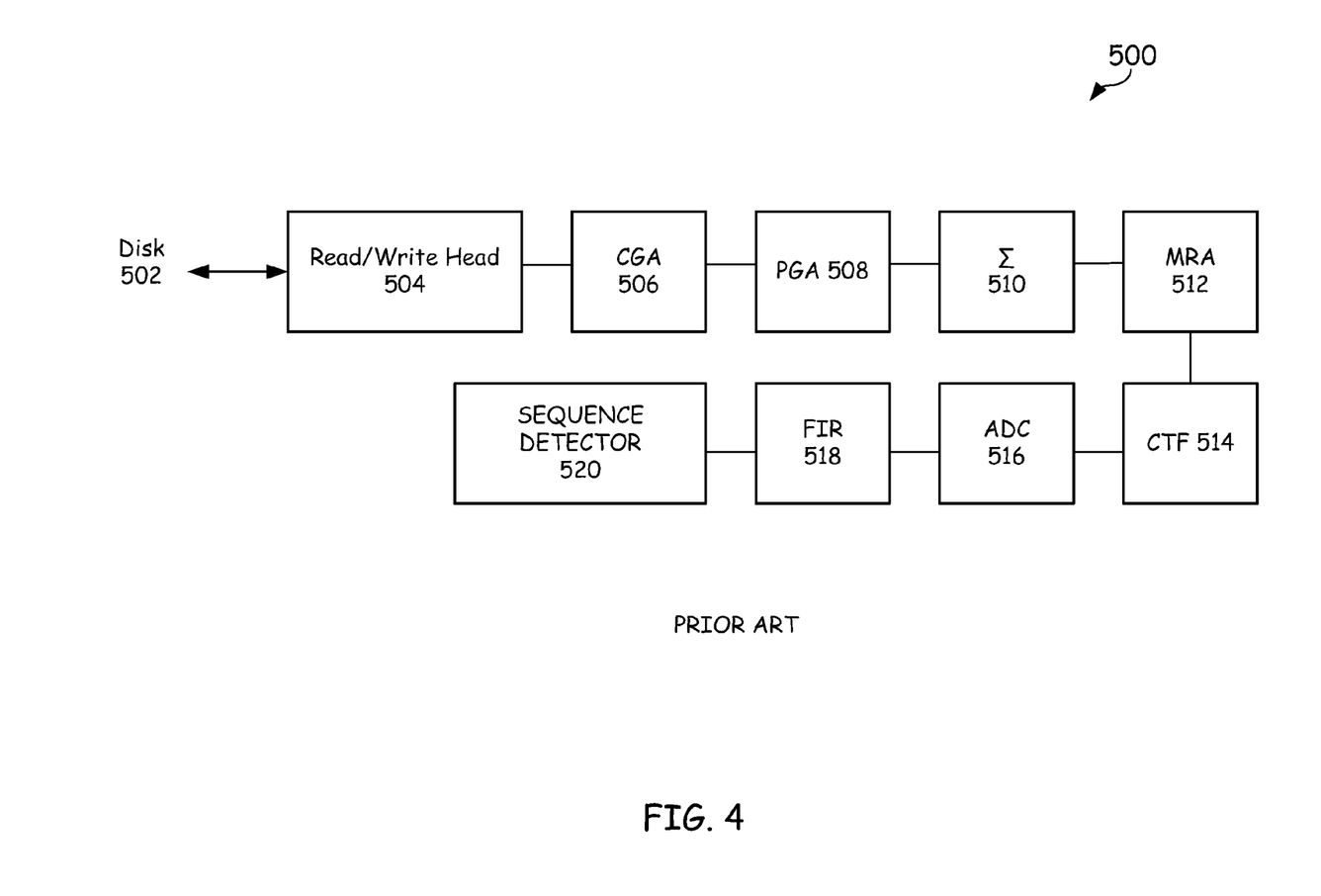
FIG. 4 is a block diagram of a prior art read data path.

FIG. 4 shows a read channel used to read data from a magnetic storage media such as a disk within a HDD. Read channel 500 includes a disc 502, read write head 504, constant gain amplifier (CGA) 506, programmable gain amplifier (PGA) 508, summing module 510, magnetic resistive asymmetry (MRA) correction module 512, continuous time filter (CTF) 514, analog to digital converter (ADC) 516, finite impulse response (FIR) filter 518, and sequence detector 520.

"Reading" a signal in a hard disk drive begins at the media (the drive's storage platter 502) and read write head 504. Read write head 504 includes a head transducer. The head transducer is located prior to a preamp in the data path. The head transducer output is driven from magnetic data pattern previously written on a rotating disk. The read sensor senses the magnetization in the recording layer of the disk and produces an analog signal as the disk media rotates below the read sensor.

Following the head transducer, a signal travels to the HDD preamplifier IC, which provides gain for the signal output as well as biasing for the head's magnetic sensor. The bias allows better reproduction of the signal's magnetic transitions. The signal, therefore, is amplified by the preamp to maximize the read-channel's capabilities once it arrives at the channel. In addition, the output of the preamplifier is differential to allow any noise pick-up to be common mode on both preamplifier differential signal lines between the preamplifier "located on suspension out by the head—and the read-channel on the drive card. The preamp differential signals travel down the suspension on flex circuit traces to a pressure connection, which transitions the signal to the drive card trace.

The channel can be a single chip or integrated as part of a storage system-on-a-chip (SoC). For this discussion, the channel refers to the core that is used in either application. A channel's chief function is to convert the analog signal presented at the input back into the digital data that has been stored on the disk.

The first stage of the analog front end (AFE) of the channel core consists of a stage to remove DC offset in the signal. This is accomplished through AC coupling and DC baseline correction. The variable gain amplifier (VGA) shown as two separate components constant gain amplifier 506 and programmable gain amplifier 508 provides gain determined by the automatic gain control loop. The main function is to control signal level for optimum performance in the ADC 516. Too much gain can cause the ADC sample values to rail at maximum or minimum ADC levels; too little gain can cause quantization noise to dominate SNR and adversely affect bit error rate performance.

Summing Junction (Σ) 510 adds in any additional DC correction necessary beyond the DC attenuation provided in the AC coupling. The goal of the DC correction is to keep the signal centered on the baseline which will become mid scale for the ADC converter so that the sequence detector 520 trellises will work optimally to determine the sequence bits from the samples presented. This also keeps signal offsets from driving the signal amplitude into saturation.

Magneto resistive asymmetry (MRA) correction module 512 and the continuous time filter (CTF) module 514 operate in the analog domain to linearize the signal prior to the ADC 516. MRA correction works to reconstruct linearity that may have been lost in the head transducer stage during the conversion of the magnetic signal on the disk to an electrical signal at the output of the head. The biasing of the head signal is adjusted to keep the signal in the linear range of the head sensitivity curve. However, if the magnetic signal amplitude changes due to fly height or disk magnetic variation exceeds the head transducer linear range, saturation in the peak or trough of the electrical head signal can occur. The MRA correction uses signal offset to determine the amount of squared signal to add back to restore the positive and negative symmetry of the signal.

The CTF module 514, applied after the MRA correction, provides mid-band peaking to help with achieving the target signal response and keeps the signal energy below the Nyquist rate to minimize any aliases that may occur when the analog signal is converted to a sampled representation. While aliases may not have a large effect on a drive surface's bit error rate performance, they can cause an impact to HDD manufacturing yields.

The ADC block 516 converts an analog signal to digital samples quantized in time and amplitude. The clock used is the output of a digital phase-locked loop, which tracks the channel rate clock frequency. The output of the ADC is used as feedback to control the timing of the digital phase-locked loop as well as the automatic gain control with PGA 508, DC baseline correction in Summing Junction (Σ) 510, and FIR adaptation in FIR filter module 518.

The finite impulse response (FIR) filter module 518 performs filtering to match signal characteristic to the ideal target response for bit detection. As with all sections of the analog front end, the performance of this filter is important to achieve the desired architectural target response.

At the output of the AFE, the signal is in a fully digital form ready for detection by sequence detector 520. Regardless of whether the data was recorded using perpendicular or horizontal techniques, the read channel AFE functions are similar. The sample stream is submitted to the sequence detector 520 to begin decoding in trellises for bit recovery. Once bit recovery is completed, parity post processing can then be performed, followed by decoding the run length limited codes and de-scrambling the resulting sequence. These steps ultimately reveal the original user data.

Figure 5:
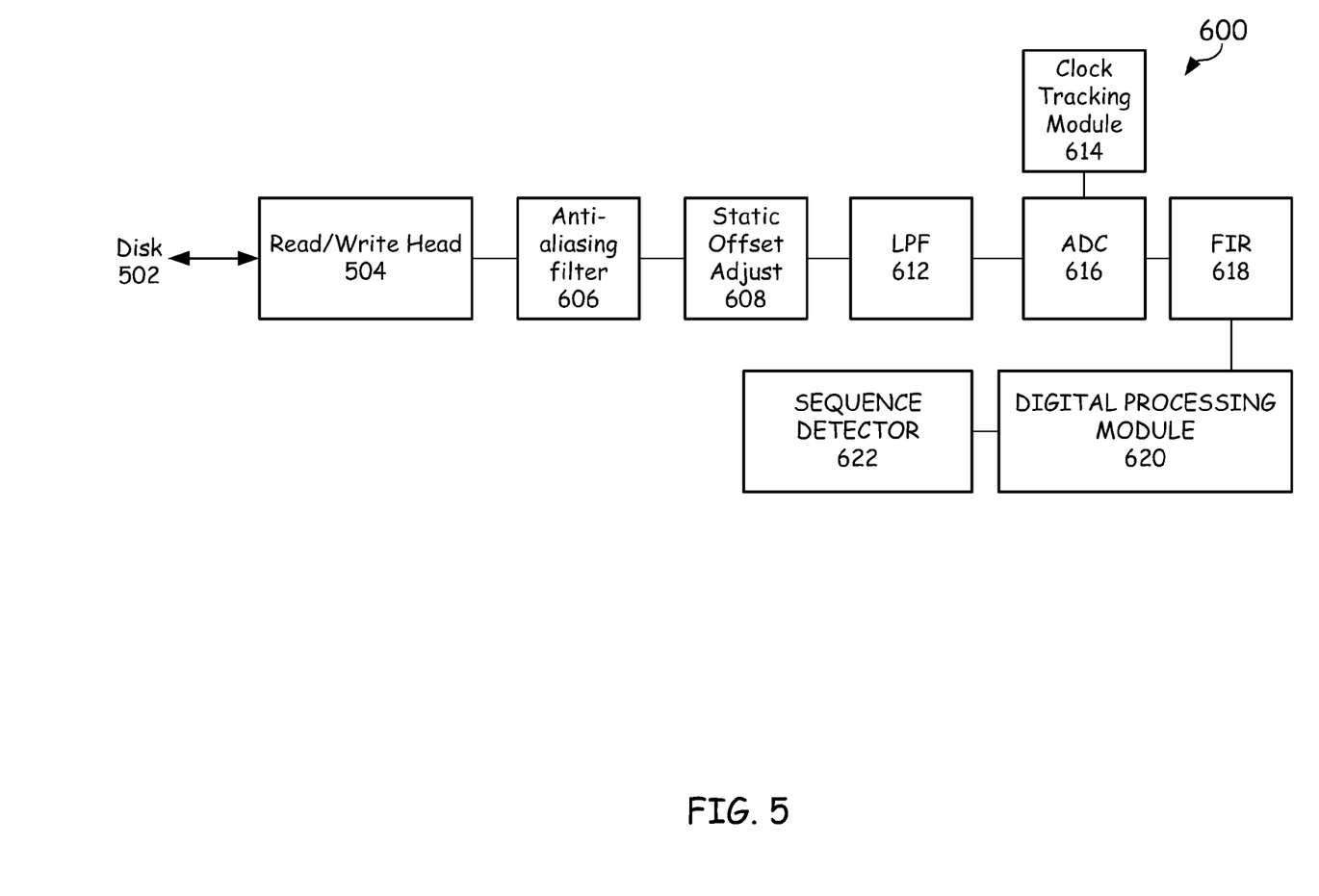
FIG. 5 is a block diagram of read path having a flat analog AFE and digital read channel compensation module in accordance with embodiments of the present invention.

FIG. 5 provides a block diagram of a read channel having a flat AFE in accordance with embodiments of the present invention. The AFE front end couples to an all digital architecture in accordance with embodiments of the present intervention. The read channel of FIG. 5 includes read write head 504, anti-aliasing filter 606, static offset adjust 608, low pass filter 602, ADC 610, clock tracking module 614, FIR 618, digital processing module 620 and sequence detector 622. Read write head 504 reads an analog signal from disc 502. The read sensor senses magnetization in the recording layer of the disk and produces an analog signal as the disk media rotates below the read's head. Anti-aliasing filter 606 may be a programmable gain amplifier that has a series of amplifiers which amplify the analog signal provided by read write head 504 to produce a signal that will allow the dynamic range of ADC 616 to be fully utilized. Static offset adjust module 608 provides additional DC correction necessary beyond that provided in the AC coupling performed within read write head 504. The goal of the DC correction provided by the static offset adjust module 608 is to keep the analog signal centered on a baseline which is mid scale for ADC converter 616 in order to allow optimal operation of the digital architecture. The baseline or DC correction does not provide high speed real time adjustments to an analog offset based on a detected or estimated transmitted signal, but rather adjustments are made to compensate for slow drifting of the analog offset due to temperature and voltage. A low pass filter operates on the DC corrected signal to provide an input to ADC 616.

ADC 616 samples the signal to produce a digital signal. ADC 616 may either oversample or samples at near equal sample rate as the Baud signaling rate but with unknown and generally drifting sample phase, and wherein an interpolation filter coupled to a digital timing recovery module processes the not synchronously sampled analog signal to produce a digital signal by interpolating the digital samples of the signal. In another embodiment, ADC 616 is directed by a DLC tracking module 614 to sample the signal on the disc as the read write head passes over the signal. This allows for any errors associated with a non-circular non-constant RPM, non-stable disk to be corrected for at the ADC. Thus, ADC 616 is providing an optimally sampled digital signal that is provided to optional FIR filter 618. FIR 618 provides a digital signal to digital processing module 620, wherein digital processing module 620 performs read channel compensation in the digital domain. This process may also be performed by the digital processing module. This read channel compensation may involve correcting errors in the baseline or DC level of the signal due to missing low frequency energy caused by high pass filter(s) in the preamp and/or the analog portion of the read channel, correcting or compensating for distortions caused by MRA or related head types asymmetry, correcting for misequalization or mismatch in magnitude and/or phase between the digitized signal and a desired target for a sequence detector, CTF filtering or other read channel compensation known to those having skill of the art. Following read channel compensation, sequence detector 622 detects a bit sequence from the compensated digital signal.

Digital processing module 620 includes processing module(s) and memory module(s). Processing module(s) can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module(s). When processing module is implemented with two or more devices, each device can perform the same steps, processes, or functions in order to provide fault tolerance or redundancy. Alternatively, the function, steps, and processes performed by processing module(s) can be split between different devices to provide greater computational speed and/or efficiency.

Memory module(s) may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module(s) implements one or more of its functions via a state machine, analog circuitry, digital circuitry, and/or logic circuitry, the memory module(s) storing the corresponding operational instructions may be embedded within, or external to, the circuitry comprising the state machine, analog circuitry, digital circuitry, and/or logic circuitry. Further note that, the memory module(s) stores, and the processing module(s) executes, operational instructions that can correspond to one or more of the steps or a process, method and/or function illustrated in FIG. 6.

Figure 6:
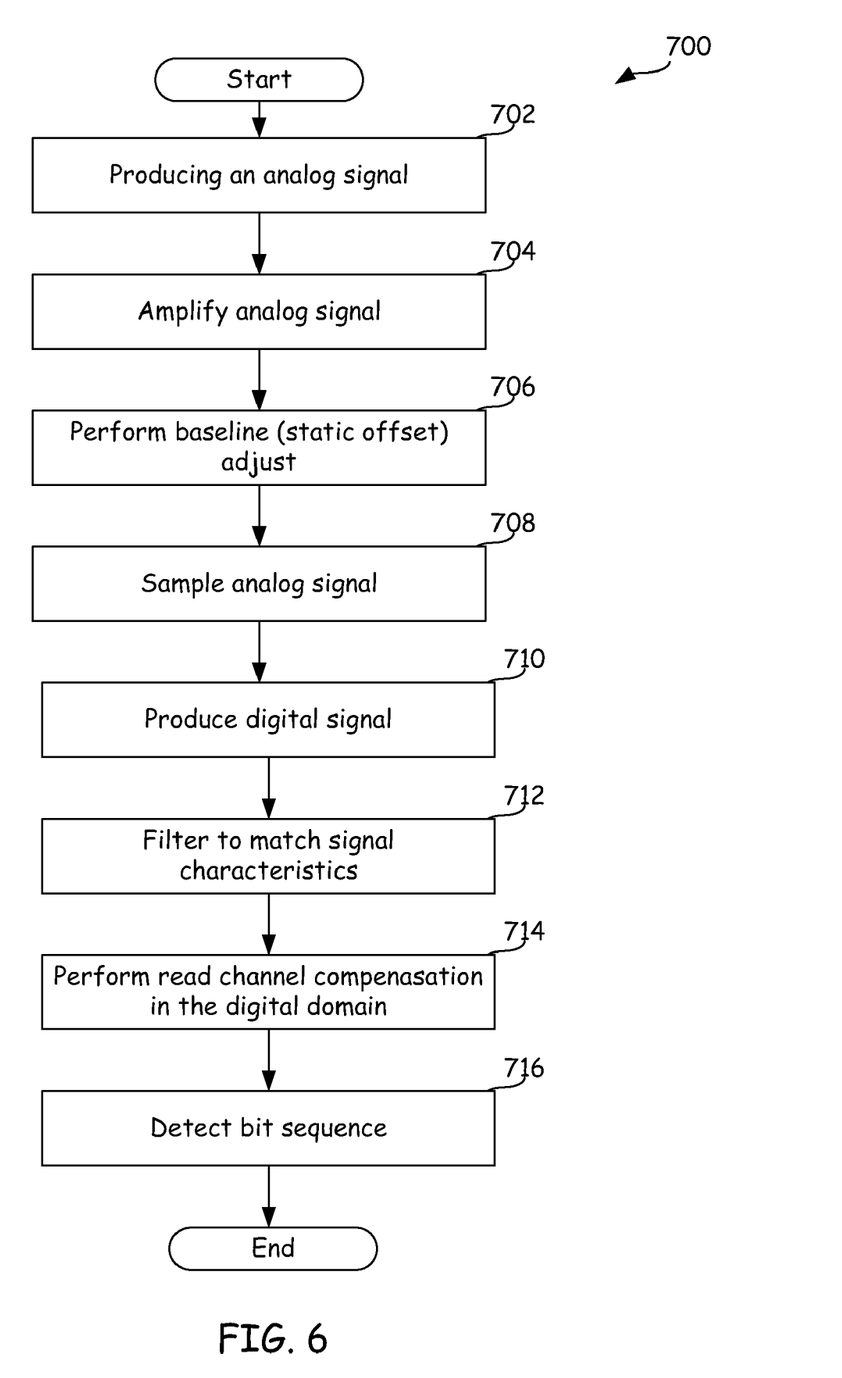
FIG. 6 provides a logic flow diagram associated with a read path having a flat analog AFE and digital read channel compensation module in accordance with the embodiments of the present invention.

FIG. 6 provides a method to read data from a magnetic storage media in accordance with embodiments of the present invention. The storage media may be a disc within a hard disc drive or other magnetic disc drive known to those having skilled in the art. Operation 700 begins by passing a read head over a magnetic storage media to produce an analog signal in step 702. This analog signal may be amplified in step 704 such that a range of the amplified analog signal substantially matches a range of an ADC to be used within this read path. A baseline adjust or static offset may then be performed in step 706 on the amplified analog signal to then center the amplified analog signal to the scale of ADC. The baseline or DC correction does not provide high speed real time adjustments to an analog offset based on a detected or estimated transmitted signal, but rather adjustments are made to compensate for slow drifting of the analog offset due to temperature and voltage. Steps 702 and 704 allow embodiments of the present invention to take full advantage of the capabilities of the ADC. In step 708 the amplified analog signal will be sampled. The signal may be either oversampled or sampled at near equal sample rate as the Baud signaling rate but with unknown and generally drifting sample phase, and wherein an interpolation filter coupled to a digital timing recovery module processes the not synchronously sampled analog signal to produce a digital signal by interpolating the digital samples of the signal. In another embodiment, the ADC is data frequency locked to the analog signal read by the read head. This may be done using a DLC tracking module. Other embodiments may over sample the amplified analog signal and then use the DLC to direct an interpolation filter to produce the appropriate digital signal based on the over sampled analog signal. In either case, step 710 a digital signal is produced from the amplified analog signal. This may be filtered in step 712 to match signal characteristics for bit detection. Read channel compensation may then be performed in the digital domain in step 714 to produce a compensated digital signal from that produced by the ADC and FIR filter. This process may also be performed by the digital processing module. This read channel compensation may involve correcting errors in the baseline or DC level of the signal due to missing low frequency energy caused by high pass filter(s) in the preamp and/or the analog portion of the read channel, correcting or compensating for distortions caused by MRA or related head types asymmetry, correcting for misequalization or mismatch in magnitude and/or phase between the digitized signal and a desired target for a sequence detector, CTF filtering or other read channel compensation known to those having skill of the art. Following read channel compensation, a sequence detector such as one using a Viterbi algorithm to detect a bit sequence from the compensated digital signal.

Embodiments of the present invention provide a system and method to read data from magnetic storage media with an analog front end (AFE) coupled to an all digital read channel compensation architecture. This involves passing a read head over a magnetic storage media to produce an analog signal. This may be done within a hard disk drive or other like storage media. The analog signal may then be amplified such that the range of the amplified analog signal substantial matches a range of the ADC used to sample the analog signal. Next a baseline adjust is performed on the amplified analog signal to remove DC content or center the amplified analog signal to a midscale of the ADC. The amplified analog signal may be sampled (or oversampled) where the sampling may be data frequency locked by a data lock clock (DLC) tracking module. A digital signal may then be produced from the amplified analog signal where this signal is filtered to match signal characteristics for bit detection and read channel compensated in the digital domain to produce a compensated digital signal which is then provided to a sequence detector which will produce a bit sequence from the compensated digital signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system operable to read data from a magnetic storage media comprising:
    a read head, the read head operable to read data from the magnetic storage media and produce an analog signal;
    a programmable gain amplifier operable to amplify the analog signal, such that the range of the amplified analog signal substantially matches a range of an analog to digital converter (ADC);
    a continuous time anti-aliasing filter to substantially reduce both noise as well as signal energy above half a Baud signaling rate of the system, but otherwise not to substantially equalize or change an analog signals magnitude or phase below half the Baud signaling rate of the system;
    an essentially static offset adjust module operable to center the amplified analog signal to a midscale of the ADC, where no high speed real time adjustments to an analog offset are made based on a detected or estimated transmitted signal, but rather adjustments are made to compensate for slow drifting of the analog offset due to temperature and voltage;
    the ADC operable to sample the amplified analog signal and produce a digital signal;
    a digital processing module operable to produce a compensated digital signal from the digital signal, such compensation comprising at least one function selected from the group comprising:
    correcting analog read channel errors within the digital signal;
    compensating for distortions caused by head type asymmetry; and
    correcting for misequalization or mismatch in magnitude and/or phase between the digitized signal and a desired target for a sequence detector; and
    a sequence detector operable to process the compensated digital signal and detect a bit sequence from the compensated digital signal.

2. The system of claim 1, wherein correcting analog read channel errors within the digital signal comprises:
    correcting baseline or DC level errors, the baseline or DC level errors due to:
    missing low frequency energy caused by high pass filter(s) in a preamp of a read channel; and/or
    missing low frequency energy caused by an analog portion of the read channel.

3. The system of claim 1, wherein the head type asymmetry comprises Magneto Resistive Asymmetry (MRA).

4. The system of claim 1, wherein the digital processing module performs linear filtering to correct for misequalization including high frequency boosting.

5. The system of claim 1, wherein the ADC either oversamples the compensated digital signal or samples at near equal sample rate as the Baud signaling rate but with unknown and generally drifting sample phase, and wherein an interpolation filter coupled to a digital timing recovery module processes the not synchronously sampled analog signal to produce a digital signal by interpolating the digital samples of the signal.

6. The system of claim 1, wherein a Disk Locked Clock (DLC) tracking module compensates for a non circular, non stable, non constant velocity magnetic storage media.

7. The system of claim 1, wherein the magnetic storage media is within a Hard Disk Drive (HDD).

8. The system of claim 7, wherein data is written longitudinally or perpendicularly within the HDD.

9. A hard disk drive (HDD) controller operable to read data from a magnetic storage media comprising:
    a read head, the read head operable to read data from the magnetic storage media and produce an analog signal;
    a programmable gain amplifier operable to amplify the analog signal, such that the range of the amplified analog signal substantially matches a range of an analog to digital converter (ADC);
    a continuous time anti-aliasing filter to substantially reduce both noise as well as signal energy above half a Baud signaling rate of the system, but otherwise not to substantially equalize or change an analog signals magnitude or phase below half the Baud signaling rate of the system;
    an essentially static offset adjust module operable to center the amplified analog signal to a midscale of the ADC;
    the ADC operable to sample the amplified analog signal and produce a digital signal;
    a digital processing module operable to produce a compensated digital signal from the digital signal; and
    a sequence detector operable to process the compensated digital signal and detect a bit sequence from the compensated digital signal.

10. The HDD controller of claim 9, wherein the essentially static offset adjust module does not apply high speed real time adjustments to an analog offset based on a detected or estimated transmitted signal, but rather adjustments are made to compensate for slow drifting of the analog offset due to temperature and voltage.

11. The HDD controller of claim 9, wherein the digital processing module performs compensation on the digital signal, the compensation comprising at least one function selected from the group comprising:
    correcting analog read channel errors within the digital signal;
    compensating for distortions caused by head type asymmetry, wherein the head type asymmetry at least comprises Magneto Resistive Asymmetry (MRA) compensation; and
    correcting for misequalization or mismatch in magnitude and/or phase between the digitized signal and a desired target for a sequence detector.

12. The HDD controller of claim 9, wherein the digital processing module performs linear filtering to correct for misequalization including high frequency boosting.

13. The HDD controller of claim 9, wherein the ADC either oversamples the compensated digital signal or samples at near equal sample rate as the Baud signaling rate but with unknown and generally drifting sample phase, and wherein an interpolation filter coupled to a digital timing recovery module processes the not synchronously sampled analog signal to produce a digital signal by interpolating the digital samples of the signal.

14. The HDD controller of claim 9, wherein a Disk Locked Clock (DLC) tracking module compensates for a non circular, non stable, non constant velocity magnetic storage media.

15. The HDD controller of claim 9, wherein the magnetic storage media is within a Hard Disk Drive (HDD).

16. The HDD controller of claim 15, wherein data is written longitudinally or perpendicularly within the HDD.

17. A method to read data from magnetic storage media, comprising:

passing a read head over a magnetic storage media to produce an analog signal;

amplifying the analog signal such that a range of the amplified analog signal substantially matches a range of an analog to digital converter (ADC);

performing a baseline adjust on the amplified analog signal to center the amplified analog signal to a midscale of the ADC;

sampling the amplified analog signal with the ADC;

producing a digital signal from the amplified analog signal;

performing read channel compensation in a digital domain to produce a compensated digital signal from the digital signal; and detecting a bit sequence form the compensated digital signal.

18. The method of claim 17, wherein read channel compensation comprises at least one function selected from the group comprising:

correcting analog read channel errors within the digital signal;

compensating for distortions caused by head type asymmetry; and correcting for misequalization or mismatch in magnitude and/or phase between the digitized signal and a desired target for a sequence.

19. The method of claim 18, wherein head type asymmetry comprises Magneto Resistive Asymmetry (MRA) compensation on the digital signal.

20. The method of claim 17, wherein read channel compensation comprises Continuous Time Filter (CTF) compensation on the digital signal.

21. The method of claim 17, wherein the ADC either oversamples the compensated digital signal or samples at near equal sample rate as the Baud signaling rate but with unknown and generally drifting sample phase, and wherein an interpolation filter coupled to a digital timing recovery module processes the not synchronously sampled analog signal to produce a digital signal by interpolating the digital samples of the signal.

22. The method of claim 17, wherein sampling of the ADC is Data frequency locked by a data lock clock (DLC) tracking module, the DLC tracking module compensates for a non circular, non stable, non constant velocity magnetic storage media.

23. The method of claim 17, wherein data is written longitudinally or perpendicularly within the HDD.

* * * * *